June 1, 1937.  N. E. KNUTZEN ET AL  2,082,700
AUTOMOBILE VENTILATOR AND WINDSHIELD HEATER
Filed Oct. 13, 1936  2 Sheets-Sheet 1
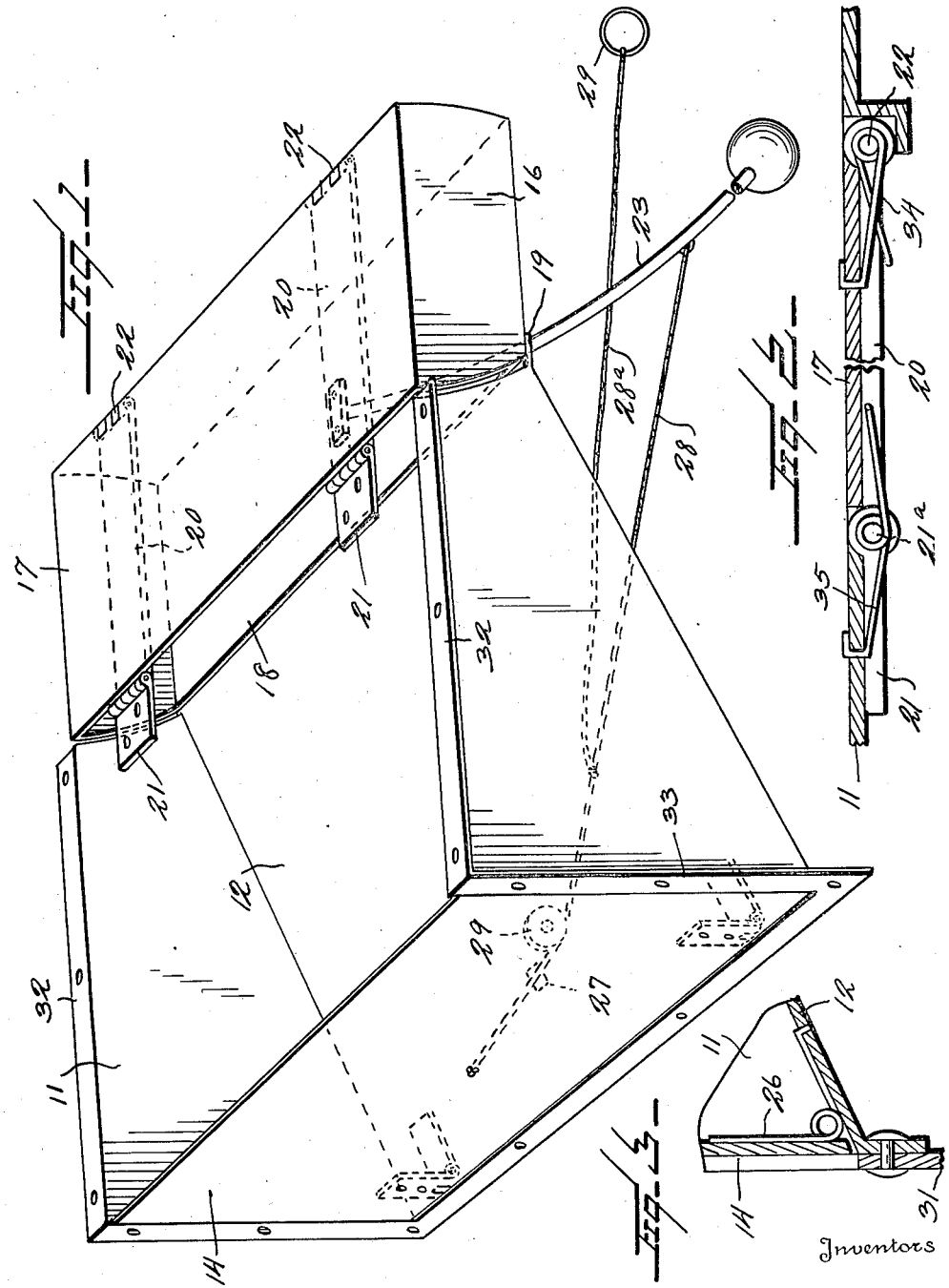
Inventors
*N. E. Knutzen*
& *N. E. Knutzen, Jr.*
By *Watson E. Coleman*
Attorney

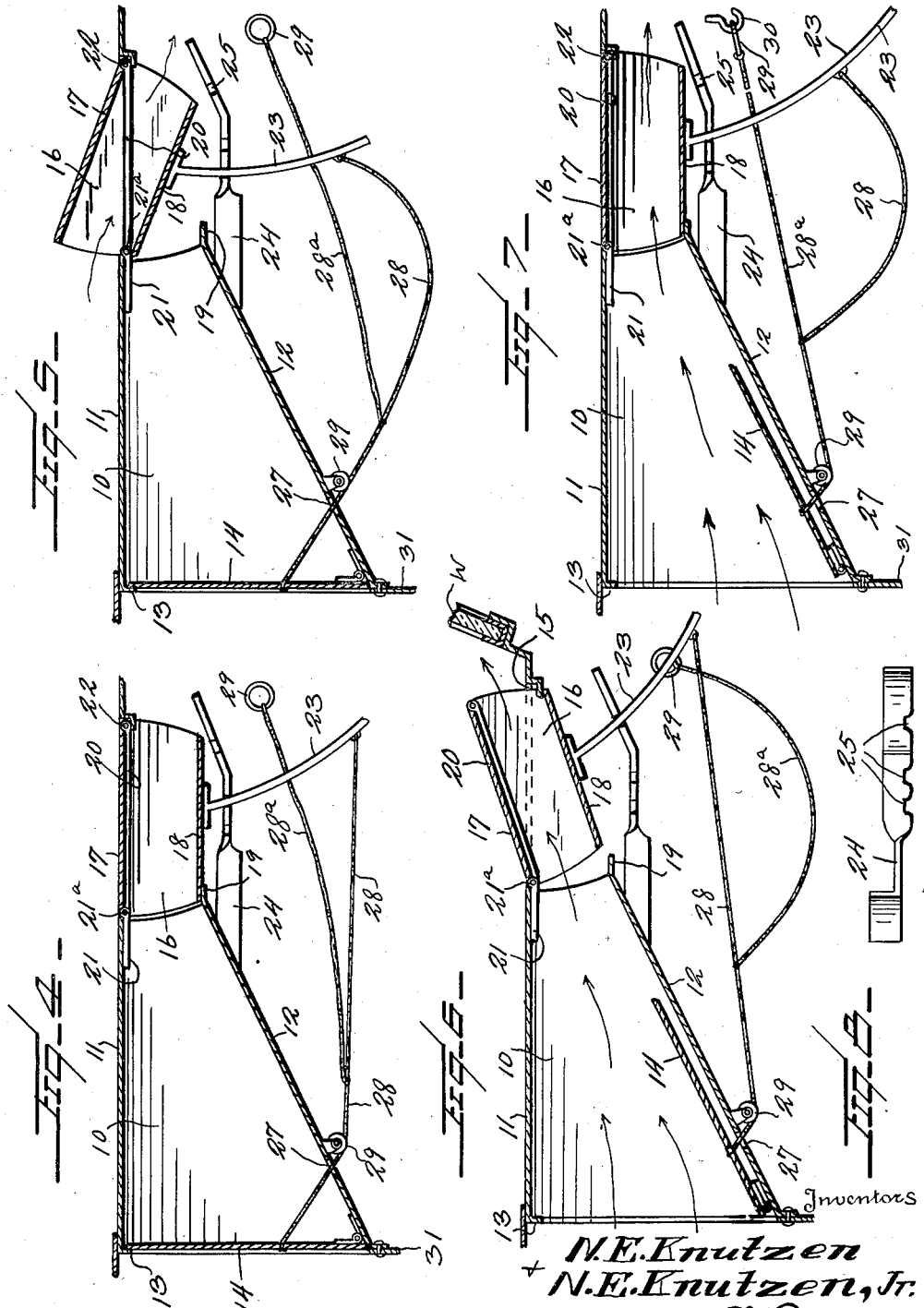

Patented June 1, 1937

2,082,700

UNITED STATES PATENT OFFICE 2,082,700

AUTOMOBILE VENTILATOR AND WINDSHIELD HEATER

Nels E. Knutzen and Nels E. Knutzen, Jr., Green Bay, Wis.

Application October 13, 1936, Serial No. 105,424

5 Claims. (Cl. 20—40.5)

This invention relates to automobiles and the general object of the invention is to provide means whereby warm air from the engine may be discharged either against the windshield to defrost the latter or may be discharged into the body of the car, or whereby fresh air may be discharged into the body of the car or the discharge of air entirely cut off.

Another object is to provide means of this character which is very simple, which may be readily applied to any make of car, which may be either initially formed with the car or sold as an attachment to be applied thereto, and in which the parts of the device may be shifted by means of a handle operable from a point beneath the instrument board.

Other objects will appear in the course of the following description.

Our invention is illustrated in the accompanying drawings wherein:

Figure 1 is a perspective view of our attachment;

Figure 2 is an enlarged fragmentary sectional view from front to rear of the hinge means whereby the ventilator is shifted;

Figure 3 is a fragmentary sectional view showing the portion of the casing, the main door thereof and the spring for yieldingly holding said door closed;

Figure 4 is a diagrammatic longitudinal section showing the ventilator in a closed position;

Figure 5 is a like view to Figure 4, but showing the ventilator turned so as to discharge fresh air into the car;

Figure 6 is a like view to Figure 5, showing the ventilator turned so as to discharge warm air from the engine against the windshield of the car;

Figure 7 is a like view to Figure 6, showing the mechanism so arranged as to discharge warm air from the engine into the body of the car;

Figure 8 is a detailed view of the means for holding the parts in adjusted position.

Referring to these drawings and particularly to Figures 4 to 7, 10 designates a casing having a top plate 11 and an upwardly inclined bottom 12. The forward end of this casing is formed with a flange 13 providing a seat for a door or shutter 14. The top plate 11 may be the cowling of the car. This top plate 11 is cut out at 15, as shown particularly in Figures 5 and 6, and disposed within this cut-out portion is an open-ended air duct 16, which constitutes the rear section of the casing. This air duct may have any desired length and is closed at its top, bottom and ends, but is open at its forward and rear sides. This air duct constitutes in effect a transversely widened tubular element. This duct 16 is so supported that the top 17 of the duct may be drawn downward to the position shown in Figure 4, where it is in alinement with the top plate 11. The bottom 18 of the duct, under these circumstances, at its forward end engages against a flange 19 formed in the upper end of the upwardly inclined lower wall 12 of the casing, or this duct may be turned up to the position shown in Figure 5, or to the position shown in Figure 6. To this end, we provide two or more hinge bars 20, each bar being hinged at its forward end to a hinge element 21 mounted on the underface of the top 11 and the rear end of the top 17 of the duct being hinged at 22 to this bar 20. Coacting with the duct 16 is a handle 23 which is shown as curved and as extending downward from the lower wall 18 of the duct 16 through the space below the wall 12 and downward and rearward to any convenient position beneath the instrument board. By pulling the handle downward to the position shown in Figure 4, the top 17 of the duct 16 will be brought into alinement with the top 11. If the handle 23 be forced upward and forward, the duct 16 will be turned to the position shown in Figure 5 turning upon the hinge 22. By throwing the rear end of the handle upward, the hinge bars 20 will be raised at their forward ends and the duct will be lifted at its forward end so as to discharge heated air from the engine compartment upward and against the windshield W.

Any suitable means may be used for holding the handle 23 in its various adjusted positions, but we have shown for this purpose a spring latch 24 illustrated in detail in Figure 8 having the notches 25. This latch is resiliently urged into a position where the notches will hold the handle 23 in any of its several positions from movement. When it is desired to release the handle so as to shift the air duct, the spring latch may either be shifted laterally and then the handle shifted or by rounding the notches 25, the handle may easily force back the spring as the handle is pulled or pushed. While we have illustrated a particular form of latch, any suitable means may be used for this purpose.

For the purpose of entirely shutting off the air from the engine compartment, we provide the closure 14 previously referred to, which is urged to its closed position by means of a spring 26, as shown in Figure 3. Attached to the closure 14 and extending through an opening 27 in the bottom plate 12 of the casing 10 is a cable 28 guided over a pulley 29, this cable at its rear end being connected to the handle 23. The cable 28 has two branches, one of which is connected to the handle 23, as before stated, the other branch 28a carrying a ring 29 coacting with a hook 30, as shown in Figure 7, which hook may be attached to any part of the frame of the automobile adjacent the instrument board.

With this construction, as shown in Figures 4 to 7, the closure 14 is yieldingly held in closed position, cutting off communication between the engine compartment and the casing 10. When the air duct 16 is turned upward to the position shown in Figure 5, the cable 28 slackens and the closure 14 remains closed, but when it is desired to discharge hot air against the windshield and the handle is shifted to the position shown in Figure 6 by pulling upward on the lower end of the handle, this will cause the cable 28 to pull the closure 14 to an open position as shown in Figure 6, so that hot air from the engine will pass up through the casing 10, through the duct 16, and against the windshield W. If it be desired to discharge hot air from the engine compartment into the car, the branch cable 28a is pulled and engaged with the hook 30, and this will cause the opening of the closure 14.

The forward end of the casing 10 is to be attached to the partition or bulkhead found in all cars and separating the engine compartment from the rear portion of the car. This bulkhead or partition is designated 31 in the figures. It will be seen that the duct 16 discharges, when in the position shown in Figures 5 and 7, into the space beneath the instrument board, and that the air passing through the duct is discharged inward and deflected downward by the instrument board.

As previously stated, the top plate 11 of the casing either may be formed as a unit with the casing, or the casing, as shown in Figure 1, need not be provided with this top plate, but the body of the casing may be flanged at 32, so as to be attached to the underface of the cowling, the cowling under these circumstances acting as the top plate. This body is also shown as provided with flanges 33 whereby it may be attached to the partition wall or bulkhead between the engine compartment and the cowling.

It is obvious that the particular arrangement of this structure within a car and the details of construction will depend upon the make of car and as to whether the device is installed initially in the car or whether it is to be purchased as a unit and afterwards installed.

In Figure 2, we have illustrated in detail the spring means for urging the hinged part 20 to its lowered or horizontal position and for urging the top plate 17 of the air duct to a position against said bar. To this end, the hinge pintle 22 is provided with a two-arm spring 34, one arm of which engages beneath the bar 20 and the other arm of which engages through the top plate 17. The bar 20 in turn is hinged to the top plate 11 by the hinge pintle 21a and a two-armed spring 35 is provided which has its middle portion coiled around the pintle 21a and has its forward arm engaged with the bar 20 while the rear arm is engaged with the member 11. It will be seen that these springs 34 and 36 will act to yieldingly hold the air duct in a closed position, that is, the position shown in Figures 4 and 7, unless the handle is either forced upward, as shown in Figure 5, or pulled upward and rearward as shown in Figure 6.

It will be seen that practically all the parts are made of sheet metal and may be readily and cheaply constructed and that the mechanism forms a very simple and practical means whereby the windshield may be kept from frosting by the discharge of hot air from the engine against the lower portion of the windshield, whereby either fresh air or heated air may be introduced into the machine or whereby the introduction of either fresh air or heated air is prevented.

While this structure might be made as wide as the windshield, yet ordinarily this will not be the case. Ordinarily, the ventilator will be about the size of the ordinary cowl ventilator on modern automobiles and may be installed in the same manner as the present type of ventilator. It is obvious also that if found desirable, two separate air ducts and two separate casings leading to the air ducts may be installed, one on each side of the center of the cowl. The device can be manufactured for installation as standard equipment when the car is built or may be installed in automobiles not carrying the same as standard equipment. Furthermore, this device may readily be installed in any ordinary cowl ventilator by the addition of the double hinge arrangement shown in Figures 4 to 7 and the other parts which form the duct controlling the flow of air either into the car or onto the windshield.

While we have illustrated one particular form of latching device 24, yet the latching device used in connection with the ventilators on any of the different models or makes of cars now in operation may be used. It will be noted that the notches 25 have rounded edges so that the lever 23 may be readily pulled out of these notches without the necessity of actually forcing the latch 24 laterally.

We have found in actual practice that this structure is exceptionally efficient as a snow and sleet remover in addition to acting as a windshield defroster. One of the biggest hazards of winter driving is in a snow or sleet storm where the snow or sleet gathers upon the exterior of the windshield and blinds the driver. By discharging hot air against the outer face of the windshield, the snow or sleet will be melted. It is obvious that a special duct might be used leading from the space immediately adjacent the exhaust manifold for the purpose of conducting the hot air from the exhaust manifold into the casing 10.

While we have illustrated certain details of construction and arrangement of parts, we do not wish to be limited thereto as obviously many changes might be made therein without departing from the spirit of the invention as defined in the appended claims.

What is claimed is:—

1. In an automobile, an air conducting casing extending from the engine compartment to the body and opening into the engine compartment and body, manually operable means for controlling the passage of air from the engine compartment into said casing, the casing including a substantially tubular air duct section supported for movement relative to the casing into an upwardly and rearwardly inclined position with the top of the forward end of the air-duct section coincident with the top of the casing to thereby discharge warm air upward against the exterior face of the windshield of the vehicle or for movement into a downwardly and rearwardly inclined position with its forward end above the casing to thereby discharge fresh unheated air into the vehicle or into a position with its top coincident with the top of the body of the casing to thus discharge warm air from the engine compartment into the body of the vehicle the manually operable means being operable independently of the air duct section.

2. In an automobile having an engine compartment, a cowling and a driver's compartment, an air conducting casing forming a portion of the cowling, the top of the casing being constituted by the cowling; the forward end of the casing opening into the engine compartment, the rear of the casing opening into the driver's compartment, the casing being gradually contracted vertically towards its rear end and having a width approximately less than the width of the windshield of the vehicle, the casing including a substantially tubular air duct section at its rear end supported for movement relative to the body of the casing, manually operable means for shifting said air duct section of the casing into an upwardly and rearwardly inclined position with the top of the section coincident with the top of the forward portion of the casing and the rear end of the bottom of the section coincident with the cowling to thus discharge warm air from the engine compartment against the windshield of the vehicle or movable into a downwardly and rearwardly inclined position with its forward end above the top of the casing to thus discharge fresh air downward and into the driver's compartment or movable into position with the top of the air duct section coincident with the top of the casing and cowling to thus discharge warm air from the engine compartment into the driver's compartment, and manually operable means for controlling the passage of warm air from the engine compartment into the forward end of the casing.

3. In an automobile having an engine compartment, a cowling and a driver's compartment, a casing, the top of which is formed by the cowling, the casing opening into the engine compartment at its forward end, the casing being gradually contracted vertically toward its rear end and opening into the driver's compartment, the rear end of the casing being formed by an open-ended substantially tubular air duct section, the top of which is coincident with the cowling, the air duct section being mounted upon a double hinge whereby either the forward end of the section may be lifted up above the cowling, or the rear end of the section lifted up above the cowling, or the section lowered to bring its top in coincidence with the cowling, manually operable means extending to the driver's compartment whereby the section may be shifted to the several positions stated, means for holding the air duct section in any one of its adjusted positions, a closure for the front of the casing, means for automatically opening said closure when the air duct section of the casing is turned to an upwardly and rearwardly inclined position, and manually operable means whereby said closure may be opened independently of the adjustment of the air duct section.

4. In an automobile having an engine compartment, a cowling and a driver's compartment, a casing, the top of which is formed by the cowling, the casing opening into the engine compartment at its forward end, the casing being gradually contracted vertically toward its rear end and opening into the driver's compartment, the rear end of the casing being formed by an open-ended substantially tubular air duct section, the top of which is coincident with the cowling, the section being mounted upon a double hinge whereby either the forward end of the section may be lifted up above the cowling or the rear end of the section lifted up above the cowling, or the section lowered to bring its top in coincidence with the cowling, manually operable means extending to the driver's compartment whereby the section may be shifted to the several positions stated, means for holding the air duct section in any one of its adjusted positions, a closure for the front of the casing, means normally urging the closure to a closed position, a cable connecting the closure to the means for shifting the casing section whereby the closure will be opened when the air duct section is shifted to its upwardly and rearwardly inclined position, and a second cable operatively connected to the closure for manually shifting it to an opened position.

5. In a structure of the character described, a casing having a top, a bottom and two sides, the bottom extending upward and rearward, the casing being open at its front and rear ends, a movable tubular open-ended air duct section disposed at the rear end of the casing and into which the casing discharges, a rod hinged to the rear end of the body of the casing and extending through the duct section and hinged to the rear end of the duct section, a downwardly and rearwardly curved handle extending from the air duct section whereby it may be shifted into an upwardly and rearwardly inclined position, into an upwardly and forwardly inclined position, or into a horizontal position, means engaging the handle for holding the section in any one of its shifted positions, a closure for the forward end of the casing, a spring urging the closure to a closed position, a cable attached to the closure and extending rearward and connected to the handle whereby upon an upward and rearward movement of the handle the closure will be opened, and a branch cable attached to the first named cable and extending rearward therefrom whereby the closure may be manually opened, the branch cable having means whereby it may be held taut when the closure is opened manually.

NELS E. KNUTZEN.
NELS E. KNUTZEN, JR.